S. WILLIAMS.
Corn-Sheller.
No. 166,832. Patented Aug. 17, 1875.
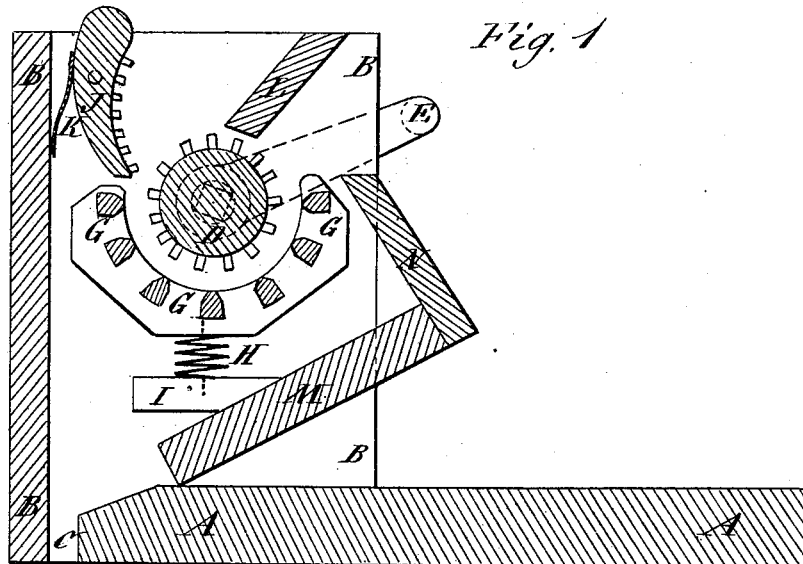
Fig. 1
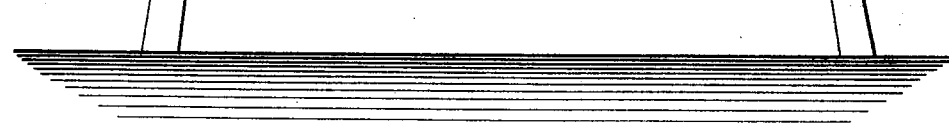
Fig. 2
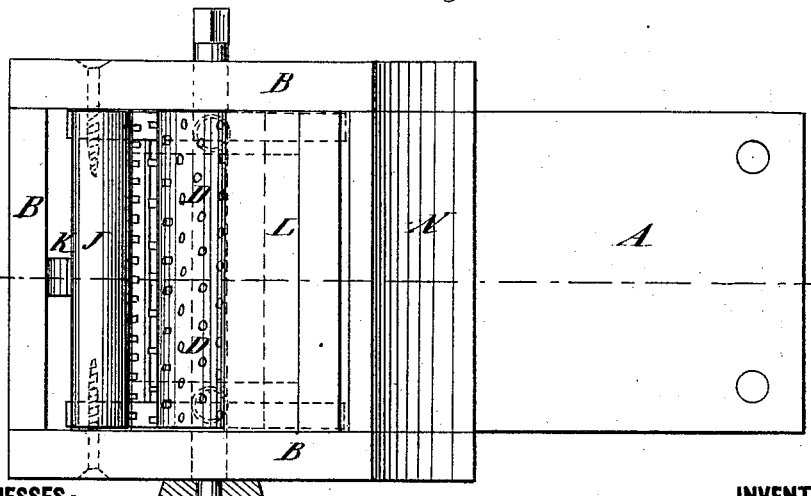
WITNESSES:
C. Neveux
N. F. Terry
INVENTOR:
S. Williams
BY
ATTORNEYS.

UNITED STATES PATENT OFFICE.

SOLOMON WILLIAMS, OF TEHUACANA, TEXAS.

IMPROVEMENT IN CORN-SHELLERS.

Specification forming part of Letters Patent No. 166,832, dated August 17, 1875; application filed April 24, 1875.

*To all whom it may concern:*

Be it known that I, SOLOMON WILLIAMS, of Tehuacana, in the county of Limestone and State of Texas, have invented a new and useful Improvement in Corn-Sheller, of which the following is a specification:

Figure 1 is a vertical section of my improved corn-sheller, taken through the line $x\ x$, Fig. 2. Fig. 2 is a top view of the same.

Similar letters of reference indicate corresponding parts.

The invention will first be described in connection with the drawing, and then pointed out in the claim.

A represents a bench, to which the sheller is attached. B is the box, which is open at the top, bottom, and rear, and is attached to the bench A in such a way that the front may project a little beyond the end of the bench A, to form a space, C, through which the shelled corn may escape. D is a cylinder, which is studded with spikes or teeth to rotate the ear of corn and carry it through the machine. This cylinder has sharp teeth, that penetrate between the grains of corn and loosen them from the cob, while they enable the roll to move them more readily. These teeth are arranged spirally, so as to commence shelling at one end of ear. The journals of the cylinder D work in bearings in the sides of the box B, and project upon the outer side of said sides. To one of the projecting journals of the cylinder D is attached the crank E, for rotating said cylinder, and to the other journal is attached the nubber F, which consists of a conical block having a conical cavity formed in it, in the surface of which are long teeth to remove the small kernels from the end of the ear, or nub it, before it is put into the sheller. G is the concave, which consists of two semi-ring end bars, connected by a number of longitudinal bars, the inner edges of which are made sharp, so as to enter between the rows of kernels and pry them off as the ear is being carried around by the cylinder D. The concave G rests upon two springs, H, attached to cleats I, which are secured to the sides of the box B, so that the concave G may adjust itself to the size of the ear passing through the machine. J is a curved board or plate, pivoted at its ends to the sides of the box B, provided with teeth upon its inner or concave side, and having a spring, K, attached to its rear side, which rests against the front of the box B. The board or plate J is designed to guide the ears into the space between the cylinder D and the concave G, as well as to do a great part of the shelling. For this purpose I make the boards J with teeth, that remove a large number of grains, and thus prepare the cob to enter the concave. L is the breast-board, which is placed in an inclined position above the rear part of the cylinder D, and the ends of which are secured to the sides of the box B. M is an inclined board placed beneath the concave G, and the ends of which are secured to the sides of the box B. The inclined board M is designed to guide the shelled corn into the discharge-opening C. N is a guard-board attached to the upper end of the inclined board M, which inclines inward and has its upper edge beveled off, and upon a level with the rear edge of the concave G. The guard-board N is designed to prevent the kernels from scattering out, and also to serve as an apron for the cobs to slide down when escaping from the machine.

The sheller may be made small and operated by hand-power, or made large and operated by animal or steam power.

Having thus described my invention, I claim as new and desire to secure by Letters Patent—

An attachment for corn-shellers, consisting of block F, having a conical cavity with ribs or teeth on the inside, and arranged upon the extended end of cylinder-journal, as and for the purpose specified.

SOLOMON WILLIAMS.

Witnesses:
H. H. YOUNG,
C. W. RATCLIFF.